(12) United States Patent
Lee et al.

(10) Patent No.: US 10,236,104 B2
(45) Date of Patent: Mar. 19, 2019

(54) FERRITE AND INDUCTOR INCLUDING THE SAME

(71) Applicant: SAMSUNG ELECTRO-MECHANICS CO., LTD., Suwon-Si, Gyeonggi-Do (KR)

(72) Inventors: Young Il Lee, Suwon-Si (KR); Byeong Cheol Moon, Suwon-Si (KR); So Yeon Song, Suwon-Si (KR); Ic Seob Kim, Suwon-Si (KR); Soo Hwan Son, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 723 days.

(21) Appl. No.: 14/271,968

(22) Filed: May 7, 2014

(65) Prior Publication Data
US 2015/0022305 A1    Jan. 22, 2015

(30) Foreign Application Priority Data

Jul. 19, 2013  (KR) .................. 10-2013-0085289
Oct. 14, 2013  (KR) .................. 10-2013-0122172

(51) Int. Cl.
*H01F 1/01*    (2006.01)
*H01F 1/34*    (2006.01)
(Continued)

(52) U.S. Cl.
CPC .............. *H01F 1/01* (2013.01); *C04B 35/26* (2013.01); *H01F 1/344* (2013.01);
(Continued)

(58) Field of Classification Search
CPC ... H01F 1/344; H01F 1/36; H01F 1/01; H01F 17/04; H01F 17/0013; H01F 41/0246;
(Continued)

(56) References Cited

U.S. PATENT DOCUMENTS 6,033,594 A * 3/2000 Enokido ............... C04B 35/265
                                                              252/62.58
6,391,222 B1   5/2002 Watanabe
(Continued)

FOREIGN PATENT DOCUMENTS

CN    101241792 A    8/2008
CN    101274846 A    10/2008
(Continued)

OTHER PUBLICATIONS

Korean Office Action issued in Korean Application No. 10-2013-0122172 dated Sep. 17, 2014, w/English translation.
(Continued)

*Primary Examiner* — Holly C Rickman (57) ABSTRACT

An inductor is provided including a multilayer body in which a plurality of magnetic layers containing a ferrite are laminated. A coil part including a plurality of conductive patterns is disposed in the multilayer body. External electrodes are electrically connected to the coil part. The ferrite may contain iron (Fe), manganese (Mn), nickel (Ni), zinc (Zn), and vanadium (V), and the ferrite may contain 40 to 55 mol % of iron (Fe) calculated as iron oxide ($Fe_2O_3$), 5 to 20 mol % of nickel (Ni) calculated as nickel oxide (NiO), 15 to 25 mol % of zinc (Zn) calculated as zinc oxide (ZnO), 15 to 30 mol % of manganese (Mn) calculated as manganese oxide (MnO), and 1 to 4 mol % of vanadium (V) calculated as vanadium oxide ($V_2O_5$).

14 Claims, 4 Drawing Sheets

(51) Int. Cl.
*H01F 17/00* (2006.01)
*H01F 17/04* (2006.01)
*H01F 27/245* (2006.01)
*H01F 27/29* (2006.01)
*C04B 35/26* (2006.01)

(52) U.S. Cl.
CPC ......... *H01F 17/0013* (2013.01); *H01F 17/04* (2013.01); *H01F 27/245* (2013.01); *H01F 27/29* (2013.01); *H01F 27/292* (2013.01); *C04B 2235/3239* (2013.01); *C04B 2235/3262* (2013.01); *C04B 2235/3279* (2013.01); *C04B 2235/3284* (2013.01); *C04B 2235/656* (2013.01); *C04B 2235/85* (2013.01)

(58) Field of Classification Search
CPC ...... H01F 27/255; H01F 27/245; H01F 27/29; H01F 27/292; H01F 5/00
See application file for complete search history.

(56) References Cited

U.S. PATENT DOCUMENTS

| | | | |
|---|---|---|---|
| 2007/0203014 A1* | 8/2007 | Watanabe | C04B 35/49 501/136 |
| 2008/0236706 A1 | 10/2008 | Che et al. | |
| 2012/0326828 A1* | 12/2012 | Nakamura | H01F 1/344 336/200 |
| 2013/0057375 A1 | 3/2013 | Ankyu et al. | |
| 2013/0057376 A1 | 3/2013 | Yamamoto et al. | |
| 2013/0062553 A1 | 3/2013 | Kim et al. | |

FOREIGN PATENT DOCUMENTS

| | | | | |
|---|---|---|---|---|
| CN | 101429017 A | | 5/2009 | |
| CN | 101857426 A | | 10/2010 | |
| CN | 102792395 A | | 11/2012 | |
| EP | 1286366 A2 | | 2/2003 | |
| EP | 2544200 A1 | | 1/2013 | |
| JP | S60-210572 A | | 10/1985 | |
| JP | H07-272917 A | | 10/1995 | |
| JP | H09-306718 A | | 11/1997 | |
| JP | 2001-076923 A | | 3/2001 | |
| JP | 2001076923 A | * | 3/2001 | |
| JP | 2004-067444 A | | 3/2004 | |
| JP | 2005-179098 A | | 7/2005 | |
| JP | 2006-199510 A | | 8/2006 | |
| JP | 2006-202796 A | | 8/2006 | |
| JP | 2008-251848 A | | 10/2008 | |
| JP | WO 2011108701 A1 | * | 9/2011 | ............. H01F 1/344 |
| JP | 2013-053042 A | | 3/2013 | |
| JP | 2013-060361 A | | 4/2013 | |
| KR | 2001-0050934 A | | 6/2001 | |
| KR | 2012-0123540 A | | 11/2012 | |
| KR | 10-2013-0025835 A | | 3/2013 | |

OTHER PUBLICATIONS

Non-Final Notice of Reasons for Rejection dated Jan. 17, 2017 issued in Japanese Patent Application No. 2014-097033 (with English translation).

First Office Action issued Aug. 24, 2016 in corresponding European Patent Application No. 201410222685.4, with English translation.

* cited by examiner

ND INDUCTOR INCLUDING THE SAME

FERRITE AND INDUCTOR INCLUDING THE SAME

CROSS-REFERENCE TO RELATED APPLICATIONS

This application claims the benefit of Korean Patent Application Nos. 10-2013-0085289 filed on Jul. 19, 2013 and 10-2013-0122172 filed on Oct. 14, 2013, with the Korean Intellectual Property Office, the disclosures of which are incorporated herein by reference.

TECHNICAL FIELD

The present disclosure relates to a ferrite and an inductor including the same.

BACKGROUND

Examples of electronic components using a ceramic material include a capacitor, an inductor, a piezoelectric element, a varistor, a thermistor, or the like.

An inductor, a ceramic electronic component, is one of an important passive device configuring an electronic circuit together with a resistor and a capacitor, and may be used to remove noise or as a component configuring an LC resonant circuit.

An inductor may be manufactured by winding or printing a coil on a ferrite core and forming electrodes at both ends of the core, or by printing internal electrodes on magnetic or dielectric sheets and then stacking the sheets.

Types of inductors may be variously divided into a multilayer inductor, a winding inductor, a thin film inductor, and the like, according to a structure thereof. The various inductors are different in terms of manufacturing methods, as well as an application range.

Among them, a winding inductor may be formed, for example, by winding a coil around a ferrite core. By increasing a winding number to obtain high inductance, stray capacitance between coils, that is, capacitance between conducting wires may be generated, such that high frequency properties of a product may be deteriorated.

In addition, a multilayer inductor may be manufactured in the form of a multilayer body in which a plurality of ferrite sheets or ceramic sheets formed of a low permittivity dielectric material are laminated.

Coil-shaped metal patterns are formed on the ceramic sheets, and the coil shaped metal patterns formed on the individual ceramic sheets are sequentially connected to one another through a conductive via and are overlapped in a vertical lamination direction of the sheets.

According to the related art, an inductor body of a multilayer inductor is generally formed of a ferrite material.

However, when the ferrite material is sintered under a reducing atmosphere, the ferrite material is reduced such that electrical properties thereof may be deteriorated.

SUMMARY

An aspect of the present disclosure may provide a ferrite capable of being sintered under a reducing atmosphere and improving insulation resistance, and an inductor including the same.

According to an aspect of the present disclosure, an inductor may include a multilayer body in which a plurality of magnetic layers containing a ferrite are laminated. A coil part including a plurality of conductive patterns is disposed in the multilayer body. External electrodes are electrically connected to the coil part. The ferrite may contain iron (Fe), manganese (Mn), nickel (Ni), zinc (Zn), and vanadium (V), and the ferrite may contain 40 to 55 mol % of iron (Fe) calculated as iron oxide ($Fe_2O_3$), 5 to 20 mol % of nickel (Ni) calculated as nickel oxide (NiO), 15 to 25 mol % of zinc (Zn) calculated as zinc oxide (ZnO), 15 to 30 mol % of manganese (Mn) calculated as manganese oxide (MnO), and 1 to 4 mol % of vanadium (V) calculated as vanadium oxide ($V_2O_5$).

The coil part may contain at least one of copper and a copper-nickel alloy.

The ferrite may be sintered simultaneously with the coil part.

The ferrite may be sintered under an atmosphere with a pressure lower than a Cu—$Cu_2O$ equilibrium oxygen partial pressure.

When a content of vanadium (V) existing in grains of the ferrite is defined as a and a content of vanadium (V) existing in grain boundaries is defined as b, a/b may be 0.8 or less (a/b≤0.8).

The ferrite may have higher insulation resistance in grain boundaries than in grains.

The ferrite may have insulation resistance of 10000 Ωcm or greater.

According to another aspect of the present disclosure, an inductor may include: a multilayer body in which a plurality of magnetic layers containing a ferrite are laminated; a coil part including a plurality of conductive patterns disposed in the multilayer body; and external electrodes electrically connected to the coil part, wherein the ferrite may contain iron (Fe), manganese (Mn), nickel (Ni), zinc (Zn), and vanadium (V), and the ferrite may contain 1.82 to 10 parts by mole of vanadium (V) calculated as vanadium oxide based on 100 parts by mole of iron (Fe) calculated as iron oxide ($Fe_2O_3$).

According to another aspect of the present disclosure, an inductor may include a multilayer body in which a plurality of magnetic layers containing a ferrite are laminated. A coil part is disposed in the multilayer body and containing copper (Cu), wherein the ferrite may be sintered simultaneously with the coil part under a reducing atmosphere.

The ferrite may contain iron (Fe), manganese (Mn), nickel (Ni), zinc (Zn), and vanadium (V), and the ferrite may contain 40 to 55 mol % of iron (Fe) calculated as iron oxide ($Fe_2O_3$), 5 to 20 mol % of nickel (Ni) calculated as nickel oxide (NiO), 15 to 25 mol % of zinc (Zn) calculated as zinc oxide (ZnO), 15 to 30 mol % of manganese (Mn) calculated as manganese oxide (MnO), and 1 to 4 mol % of vanadium (V) calculated as vanadium oxide ($V_2O_5$).

When a content of vanadium (V) existing in grains of the ferrite is defined as a and a content of vanadium (V) existing in grain boundaries of the ferrite is defined as b, a/b may be 0.8 or less (a/b≤0.8).

According to another aspect of the present disclosure, a ferrite may contain iron (Fe), manganese (Mn), nickel (Ni), zinc (Zn), and vanadium (V), wherein the ferrite may contain 40 to 55 mol % of iron (Fe) calculated as iron oxide ($Fe_2O_3$), 5 to 20 mol % of nickel (Ni) calculated as nickel oxide (NiO), 15 to 25 mol % of zinc (Zn) calculated as zinc oxide (ZnO), 15 to 30 mol % of manganese (Mn) calculated as manganese oxide (MnO), and 1 to 4 mol % of vanadium (V) calculated as vanadium oxide ($V_2O_5$).

The ferrite may be sintered under an atmosphere with a pressure lower than a Cu—$Cu_2O$ equilibrium oxygen partial pressure.

When a content of vanadium (V) existing in grains of the ferrite is defined as a and a content of vanadium (V) existing in grain boundaries of the ferrite is defined as b, a/b may be 0.8 or less (a/b≤0.8).

According to another embodiment of the present disclosure, an inductor is provided comprising a ferrite body having first and second opposing sides. A conductive coil is disposed in the ferrite body. A first external electrode disposed on the first side of the ferrite body electrically connected to the conductive coil, and a second external electrode disposed on the second side of the ferrite body electrically connected to the conductive coil. The ferrite comprises iron (Fe), manganese (Mn), nickel (Ni), zinc (Zn), and vanadium (V). The conductive coil comprises copper, copper-nickel alloy, or mixtures thereof.

In certain embodiments, the ferrite may contain 40 to 55 mol % of iron (Fe) calculated as iron oxide ($Fe_2O_3$), 5 to 20 mol % of nickel (Ni) calculated as nickel oxide (NiO), 15 to 25 mol % of zinc (Zn) calculated as zinc oxide (ZnO), 15 to 30 mol % of manganese (Mn) calculated as manganese oxide (MnO), and 1 to 4 mol % of vanadium (V) calculated as vanadium oxide ($V_2O_5$).

BRIEF DESCRIPTION OF DRAWINGS

The above and other aspects, features and other advantages of the present disclosure will be more clearly understood from the following detailed description taken in conjunction with the accompanying drawings.

DETAILED DESCRIPTION

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Figure 1:
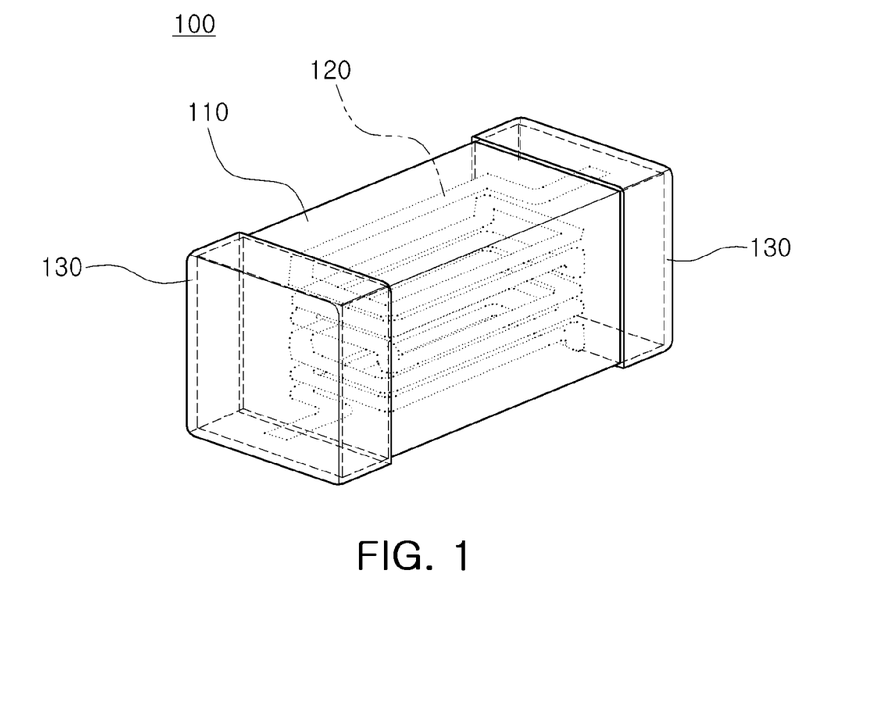
FIG. 1 is a perspective view showing an inductor according to an exemplary embodiment of the present disclosure.
Figure 2:
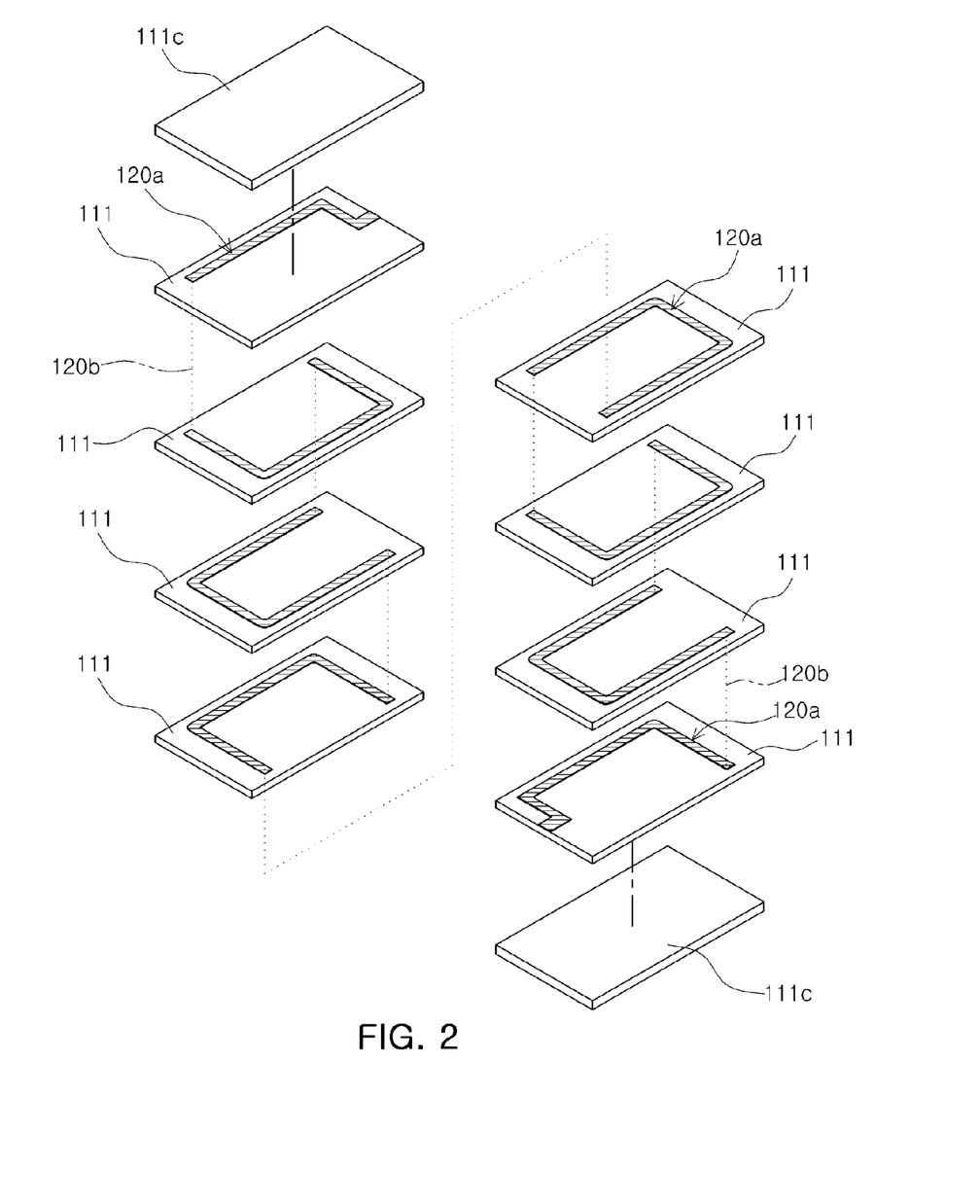
FIG. 2 is an exploded perspective view showing a structure of the inductor according to the exemplary embodiment of the present disclosure in which magnetic layers and conductive patterns are formed.
Figure 3:
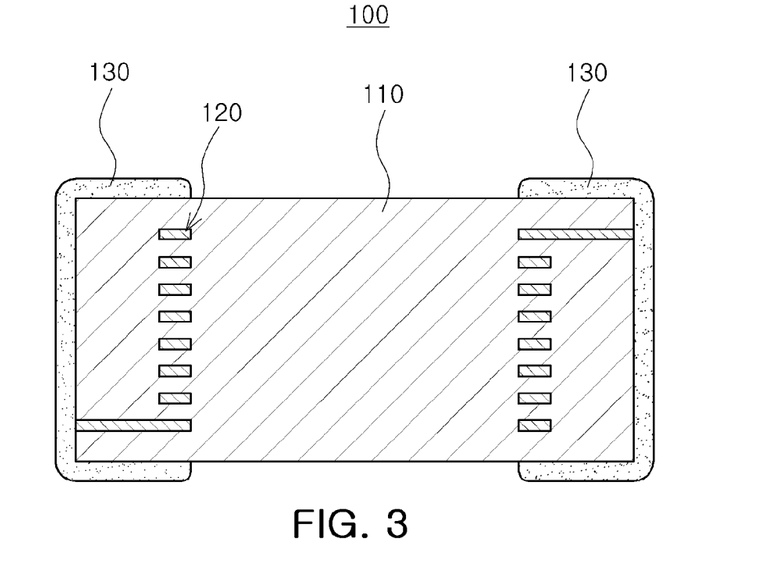
FIG. 3 is a cross-sectional view schematically showing the inductor according to the exemplary embodiment of the present disclosure.

FIG. 1 is a perspective view showing an inductor according to an exemplary embodiment of the present disclosure. FIG. 2 is an exploded perspective view showing a structure of the inductor according to the exemplary embodiment of the present disclosure in which magnetic layers and conductive patterns are formed. FIG. 3 is a cross-sectional view schematically showing the inductor according to the exemplary embodiment of the present disclosure.

Referring to FIGS. 1 through 3, a multilayer inductor 100 according to an exemplary embodiment of the present disclosure may include a multilayer body 110, a coil part 120, and external electrodes 130.

The multilayer body 110 may be formed by stacking a plurality of magnetic layers 111 in a thickness direction and then sintering the same. In this case, a shape and a dimension of the multilayer body 110 and the number of stacked magnetic layers 111 are not limited to those of this exemplary embodiment shown in the accompanying drawings.

The shape of the multilayer body 110 is not particularly limited, but may be, for example, a hexahedral shape. In this exemplary embodiment, for convenience of explanation, two surfaces of the multilayer body 110 opposing each other in the thickness direction may be defined as upper and lower surfaces. Two surfaces of the multilayer body 110 connecting the upper and lower surfaces to each other and opposing each other in a length direction may be defined as end surfaces. Two surfaces of the multilayer body 110 vertically intersecting with the end surfaces and opposing each other in a width direction may be defined as side surfaces.

The magnetic layer 111 may contain a ferrite according to an exemplary embodiment of the present disclosure. The ferrite may contain iron (Fe), manganese (Mn), nickel (Ni), zinc (Zn), and vanadium (V). The ferrite may contain 40 to 55 mol % of iron (Fe) calculated as iron oxide ($Fe_2O_3$), 5 to 20 mol % of nickel (Ni) calculated as nickel oxide (NiO), 15 to 25 mol % of zinc (Zn) calculated as zinc oxide (ZnO), 15 to 30 mol % of manganese (Mn) calculated as manganese oxide (MnO), and 1 to 4 mol % of vanadium (V) calculated as vanadium oxide ($V_2O_5$). In other words, the amounts of the metals in the ferrite is determined based on the amount of the specified metal oxide in the ferrite.

The ferrite containing iron, manganese, nickel, zinc, and vanadium contains 1 to 4 mol % of vanadium calculated as vanadium oxide, such that a reduction resistance may be improved and the ferrite may be sintered under reduction conditions at which the coil part is not oxidized. Therefore, the magnetic layer containing the ferrite may be sintered simultaneously with the coil part.

Particularly, when the coil part contains copper having high reactivity, in order to simultaneously sinter the magnetic layer and the coil part, the sintering process should be performed under an atmosphere with a pressure lower than a Cu—$Cu_2O$ equilibrium oxygen partial pressure so that copper contained in the coil part is not oxidized. The ferrite may be sintered under the atmosphere with a pressure lower than a Cu—$Cu_2O$ equilibrium oxygen partial pressure due to an increase in reduction resistance. In the case in which the magnetic layer contains the ferrite, the magnetic layer may be sintered simultaneously with the coil part containing copper.

Further, a greater content of vanadium (V) may exist in grain boundaries than in grains of the ferrite. When a content of vanadium (V) existing in the grains of the ferrite is defined as a and a content of vanadium (V) existing in the grain boundaries of the ferrite is defined as b, a/b may be 0.8 or less (a/b≤0.8).

In the case in which a/b is greater than 0.8, the content of vanadium existing in the grains and the grain boundaries is similar, such that an effect of increasing grain boundary resistance may be decreased. That is, in the case in which a/b is greater than 0.8, an effect of increasing insulation resistance of the ferrite due to addition of vanadium may not be prominently exhibited.

Vanadium existing in the grain boundaries may increase insulation resistance of the grain boundaries, such that the ferrite may have higher insulation resistance in the grain boundaries than in the grains.

The ferrite may have an insulation resistance of 10000 Ωcm or greater. When an internal electrode is formed to have a multilayer structure, in the case in which the insulation resistance of the ferrite contained in the magnetic layer is low, parallel resistance may be additionally generated due to a deterioration in insulation properties of the magnetic layer disposed between electrode layers, such that capacitance of a product may be deteriorated. However, in the case in which the insulation resistance of the ferrite is 10000 Ωcm or greater, even when the internal electrode is formed of the plurality of electrode layers, sufficient insulation properties may be secured.

Conductive patterns 120a forming the coil part 120 may be formed on one surface of a plurality of magnetic layers, and conductive vias 120b for electrically connecting adjacent conductive patterns disposed in a vertical direction to each other may be formed to penetrate through the magnetic layers in a thickness direction of the magnetic layers.

Therefore, an end of a conductive pattern formed on a magnetic layer may be electrically connected to an end of a conductive pattern formed on an adjacent magnetic layer through a conductive via formed in the magnetic layer, thereby forming the coil part 120.

In addition, both ends of the coil part 120 may be led to the outside of the multilayer body 110 to thereby be electrically connected to a pair of external electrodes 130 formed on outer surfaces of the multilayer body 110, respectively.

Particularly, both ends of the coil part 120 may be led to both ends of the multilayer body 110, and the pair of the external electrodes may be formed on both ends of the multilayer body 110.

The conductive pattern may be formed on a sheet forming the magnetic layer using a conductive paste for conductive patterns by a thick film printing method, a coating method, a deposition method, a sputtering method, and the like, but the present disclosure is not limited thereto.

The conductive via may be formed by forming a through hole in each sheet in the thickness direction and filling the through hole with a conductive paste, or the like, but the present disclosure is not limited thereto.

Further, as a conductive metal contained in the conductive paste for conductive patterns, one of silver (Ag), palladium (Pd), platinum (Pt), nickel (Ni), and copper (Cu), or an alloy thereof may be used, but the present disclosure is not limited thereto.

Generally, copper or nickel is cheaper than noble metals such as silver, palladium, and platinum, but reactivity thereof is high. Accordingly, in the case in which the coil part contains copper or nickel, it may be difficult to simultaneously sinter the magnetic layer and the coil part.

However, according to the exemplary embodiment of the present disclosure, there may be provided a ferrite capable of simultaneously sintering the coil part and the magnetic layer even when the coil part contains copper (Cu) or nickel (Ni), which are cheaper metals than the other above-mentioned metals.

A NiZn-based ferrite or NiCuZn-based ferrite generally used in the related art needs to be sintered under an air atmosphere, and in the case in which a metal material having high reactivity such as nickel, copper, or the like, is sintered simultaneously with the ferrite under air atmosphere, the metal material may be oxidized.

Therefore, in order to apply a metal such as nickel and copper having reactivity higher than that of silver (Ag), palladium (Pd), and platinum (Pt) to an internal conductive pattern of the multilayer inductor and sinter the metal simultaneously with the ferrite contained in the magnetic layer, a conductive paste containing nickel or copper is applied to the magnetic layer, and then the sintering process needs to be performed under an atmosphere, such as a reducing atmosphere, in which the metal is not oxidized.

Meanwhile, when the sintering process is performed under a reducing atmosphere in order to avoid oxidation of the metal material, in the case of the NiZn-based ferrite or NiCuZn-based ferrite, $Fe_2O_3$ in the ferrite may be reduced into $Fe_3O_4$, such that a specific resistance p may be deteriorated. That is, since electric properties such as impedance, or the like, may be deteriorated due to the deterioration of specific resistance, there is a need for a ferrite capable of securing insulation and electric properties even in the case of being sintered simultaneously with a metal material having high reactivity.

Hereinafter, a multilayer inductor in which a coil part containing copper (Cu) will be described by way of an example in order to explain that even when the coil part contains copper, a magnetic layer containing a ferrite according to an exemplary embodiment of the present disclosure can be sintered simultaneously with the coil part.

However, it is apparent that when the ferrite according to the exemplary embodiment of the present disclosure is applied to the magnetic layer, even in the case in which a metal (for example, silver, palladium, platinum, or the like) having a reactivity lower than that of copper is applied to the coil part, the magnetic layer and the coil part may be simultaneously sintered.

In the case in which the coil part of the multilayer inductor contains copper (Cu), the reducing atmosphere may refer to an atmosphere with a pressure lower than a Cu—$Cu_2O$ equilibrium oxygen partial pressure.

A NiMnZn-based ferrite magnetic composition capable of securing insulation properties even in the case of being sintered simultaneously with a metal material containing copper (Cu) as a main ingredient, and a ceramic electronic component using the same have been disclosed in Korean Patent Laid-open Publication No. 10-2013-0025835 (KR 10-2013-0025835).

In the case of the NiMnZn-based ferrite magnetic composition disclosed in KR 10-2013-0025835, it has been confirmed that electrical properties in the case of applying the composition to a product including a single-layer copper (Cu) conductive pattern were similar to that in the case of applying the composition to a product including a single-layer silver (Ag) conductive pattern. However, it has been confirmed that in an electronic component containing the NiMnZn based ferrite magnetic composition disclosed in KR 10-2013-0025835, in the case of using a conductive pattern formed of copper (Cu) and having a multilayer structure instead of a single layer structure, the capacitance was decreased, and electrical properties of the ferrite were not exhibited.

Figure 4:
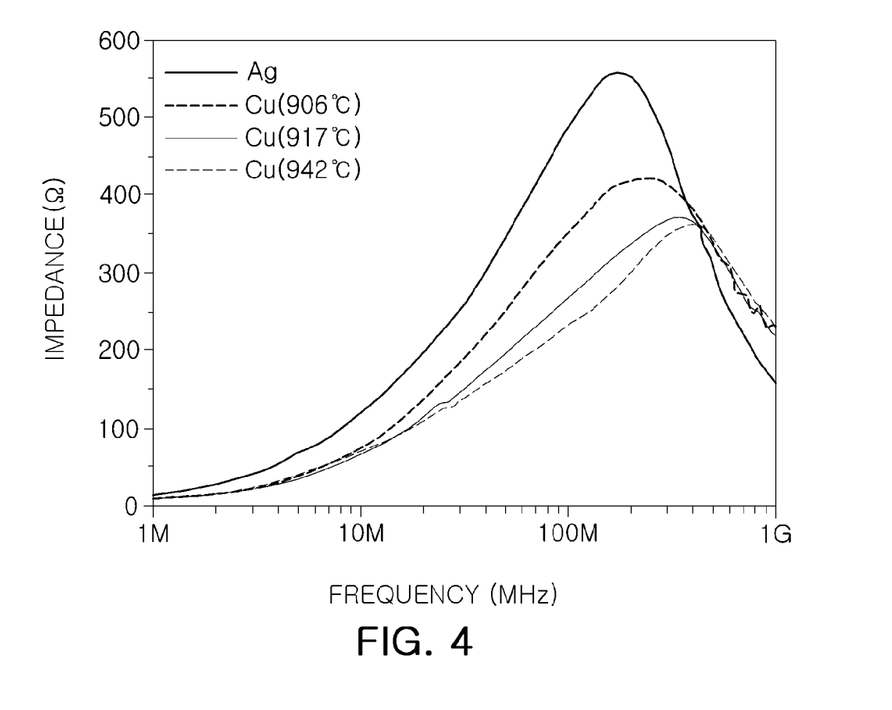
FIGS. 4 and 5 are graphs showing impedance properties of a multilayer inductor according to frequency.

In detail, FIG. 4 is a graph showing impedance properties of a multilayer inductor containing a ferrite composition within a range disclosed in KR 10-2013-0025835 in the cases of using a conductive pattern formed of silver (Ag) and copper (Cu), according to frequency. The impedance properties shown in FIG. 4 were measured using a multilayer inductor obtained by forming a magnetic layer using a ferrite composition (satisfying the range disclosed in Patent Document 1) containing $Fe_2O_3$ (46 mol %), NiO (11 mol %), MnO (23 mol %), and ZnO (20 mol %) and then stacking five layers of the conductive pattern. Further, in the case of using the conductive pattern formed of silver (Ag), electrical properties were measured using a multilayer inductor sintered at about 900° C., and in the case of using the conductive pattern formed of copper (Cu), impedance properties were measured using three kinds of multilayer inductors sintered at about 906° C., 917° C., and 942° C. Each of the sintering atmospheres were set to an atmosphere in which the conductive pattern was not oxidized.

As shown in FIG. 4, in the case of applying the ferrite composition within the range disclosed in KR 10-2013-0025835 to the magnetic layer and using the conductive pattern formed of copper (Cu), impedance properties in an inductor having a multilayer conductive pattern were significantly deteriorated as compared to the case of applying the conductive pattern formed of silver (Ag).

It has been confirmed that the deterioration of the impedance properties in the case of using the conductive pattern formed of copper (Cu) is caused by a decrease in insulation properties between the multilayer conductive pattern and the magnetic layer having the ferrite. Generally, at the time of sintering a chip, a binder contained in a paste for forming conductive patterns may be co-sintered. In this case, a relatively strong reducing atmosphere may be formed in the vicinity of electrodes while exhausting ambient oxygen. In a chip in which the conductive pattern is formed of a single layer, an influence of the conductive pattern may be small, but as the number of layers of the conductive pattern is increased, the ferrite contained in the magnetic layers between the conductive patterns may be decomposed by the strong reducing atmosphere between the conductive patterns, thereby deteriorating the insulation properties. That is, parallel resistance may be additionally generated due to deterioration of the insulation properties of the ferrite between the conductive patterns, such that capacitance of the product may be lowered.

However, in the case in which the ferrite according to the embodiment of the present disclosure is used between layers of the conductive pattern, insulation properties (the capacitance of a product) may not be deteriorated.

In detail, the ferrite according to the embodiment of the present disclosure may contain iron (Fe), manganese (Mn), nickel (Ni), zinc (Zn), and vanadium (V). More specifically, the ferrite may contain 40 to 55 mol % of iron (Fe) calculated as iron oxide ($Fe_2O_3$), 5 to 20 mol % of nickel (Ni) calculated as nickel oxide (NiO), 15 to 25 mol % of zinc (Zn) calculated as zinc oxide (ZnO), 15 to 30 mol % of manganese (Mn) calculated as manganese oxide (MnO), and 1 to 4 mol % of vanadium (V) calculated as vanadium oxide ($V_2O_5$).

A ferrite containing 0.01 to 0.1 wt % of vanadium oxide ($V_2O_5$) has been disclosed in Korean Patent Laid-open Publication No. 10-2001-0050934 (KR 10-2001-0050934), and a ferrite containing 0.001 to 0.05 mass % of vanadium oxide ($V_2O_5$) has been disclosed in Korean Patent Laid-open Publication No. 2006-202796 (KR 2006-202796).

However, the content of vanadium oxide ($V_2O_5$) contained in the ferrite in KR 10-2002-0050934 and KR 2006-202796 is different from that in the embodiment of the present disclosure, and KR 10-2002-0050934 and KR 2006-202796 do not disclose that electric properties of the ferrite may be improved at the time of sintering the ferrite under a strong reducing atmosphere as in a case of having a multilayer conductive pattern in an electronic component as compared to a case of applying a single-layer conductive pattern.

Further, KR 2006-202796 discloses that resistance at grain boundaries may be increased by adding vanadium oxide ($V_2O_5$), but the resistance at the grain boundaries in KR 2006-202796 is increased by suppressing grain growth of the ferrite, which is different from the present disclosure.

That is, the grain growth in KR 10-2002-0050934 and KR 2006-202796 is suppressed by adding a very small amount of vanadium oxide; however, according to the embodiment of the present disclosure, an amount of vanadium oxide is higher than that disclosed in KR 10-2002-0050934 and KR 2006-202796. In the case of adding a small amount of vanadium oxide as disclosed in KR 10-2002-0050934 and KR 2006-202796, the grain grown may be suppressed, such that the number of grain boundaries may be increased. Since the ferrite has higher resistance at the grain boundaries as compared to the grains, when a ratio of the grain boundaries within the ferrite is increased, resistance may be increased. In the case of adding a very small amount of vanadium oxide as disclosed in KR 10-2002-0050934 and KR 2006-202796, the ratio of the grain boundaries within the ferrite may be increased, and thus, only the resistance of the ferrite is increased, but an effect of increasing a specific resistance value of the grain boundaries themselves is hardly generated.

That is, an effect of increasing resistance at the grain boundaries due to suppression of the grain growth as disclosed in KR 10-2002-0050934 and KR 2006-202796 may be obtained by another additive instead of vanadium oxide. This may be clearly confirmed from the following description of KR 10-2002-0050934 and KR 2006-202796: a plurality of oxides including vanadium oxide are listed and at least one thereof (at least one or two oxides selected from $Ta_2O_5$ (0.005~0.1 mass %), $ZrO_2$ (0.01~0.15 mass %), $Nb_2O_5$ (0.005~0.05 mass %), $V_2O_5$ (0.001~0.05 mass %), $HfO_2$ (0.005~0.05 mass %), $Bi_2O_2$ (0.003~0.03 mass %), $MoO_3$ (0.003~0.03 mass %), $TiO_2$ (0.01~0.3 mass %), and $SnO_2$ (0.01~2.0 mass %) may be added. In addition, an effect of suppressing grain growth to increase resistance as described above may be obtained by adjusting sintering conditions such as a sintering temperature or time.

However, according to an embodiment of the present disclosure, a compositional range of vanadium oxide capable of uniformly existing in the grain boundaries regardless of grain growth and increasing specific resistance of the grain boundaries is suggested, such that the ferrite of which the specific resistance may be significantly improved as compared to the ferrites disclosed in KR 10-2002-0050934 and KR 2006-202796 may be provided. That is, in the case of adding a very small amount of vanadium oxide as disclosed in KR 10-2002-0050934 and KR 2006-202796, it is difficult to uniformly distribute vanadium in the grain boundaries, and thus, an effect of increasing specific resistance of the grain boundaries is not exhibited; however, in the case in which at least 1 mol % or greater of vanadium calculated as vanadium oxide is contained as disclosed in the present disclosure, vanadium oxide may uniformly exist in the grain boundaries, whereby the specific resistance of the grain boundaries may be increased.

In other words, in the case of adding a very small amount of vanadium oxide as disclosed in KR 10-2002-0050934 and KR 2006-202796, vanadium may locally exist in a spot shape, such that specific resistance is not increased. However, in the case in which at least 1 mol % or greater of vanadium calculated as vanadium oxide is contained, as disclosed in the embodiment of the present disclosure, vanadium oxide may be uniformly distributed in the grain boundaries of the ferrite in a continuous shape.

As in Experimental Examples to be described below, it may be appreciated that in the case of adding vanadium oxide in ranges disclosed in KR 10-2002-0050934 and KR 2006-202796, an effect of increasing the resistance of the ferrite was insignificant, but in the case of the ferrite to which vanadium oxide was added in a numerical range according to the embodiment of the present disclosure, an increase in the specific resistance value was clearly exhibited at upper and lower limits of the numerical range. Therefore, vanadium oxide ($V_2O_5$) may be contained in a range of 1 to 4 mol %.

In the ferrite according to an embodiment of the present disclosure, iron (Fe) calculated as iron oxide ($Fe_2O_3$) may be contained in a range of 40 to 55 mol %. In the case in which a content of iron oxide ($Fe_2O_3$) is less than 40 mol %, specific resistance may be decreased. In the case in which the content of iron oxide ($Fe_2O_3$) is greater than 55 mol %, that is, the content of iron oxide ($Fe_2O_3$) is excessively high, $Fe_2O_3$ may be easily reduced into $Fe_3O_4$, whereby the specific resistance may be decreased.

In the ferrite according to an embodiment of the present disclosure, manganese (Mn) calculated as manganese oxide (MnO) may be contained in a range of 15 to 30 mol %. Since manganese oxide (MnO) is reduced prior to iron oxide ($Fe_2O_3$) at a high temperature, the sintering of the ferrite needs to be completed before $Fe_2O_3$ is reduced into $Fe_3O_4$. However, in the case in which a content of manganese oxide (MnO) is less than 15 mol %, $Fe_2O_3$ may be easily reduced into $Fe_3O_4$, whereby the specific resistance may be decreased, and even in the case in which the content of manganese oxide (MnO) is greater than 30 mol %, the specific resistance may be decreased, whereby it may be difficult to secure the insulation properties.

Further, zinc (Zn) calculated as zinc oxide (ZnO) may be contained in a range of 15 to 25 mol %. In the case in which a content of ZnO is greater than 25 mol %, a Curie temperature (Tc) may be decreased, and thus, when the ferrite is applied to an electronic component, high temperature reliability may be decreased. Further, in the case in which the content of ZnO is less than 15 mol %, it may be difficult to exhibit an effect of increasing magnetic permeability.

In addition, a content of nickel may be appropriately determined according to the contents of iron, manganese, zinc, and vanadium. Nickel (Ni) calculated as nickel oxide (NiO) may be contained in a range of 5 to 20 mol %.

The ferrite according to the embodiment of the present disclosure may be sintered simultaneously with the coil part containing copper (Cu) and be sintered under an atmosphere with a pressure lower than a Cu—$Cu_2O$ equilibrium oxygen partial pressure. Further, since the coil part containing copper has a multilayer structure including a plurality of conductive patterns, even when a strong reducing atmosphere is formed at the time of sintering, sufficient specific resistance may be secured, such that the impedance properties may be improved.

Figure 5:
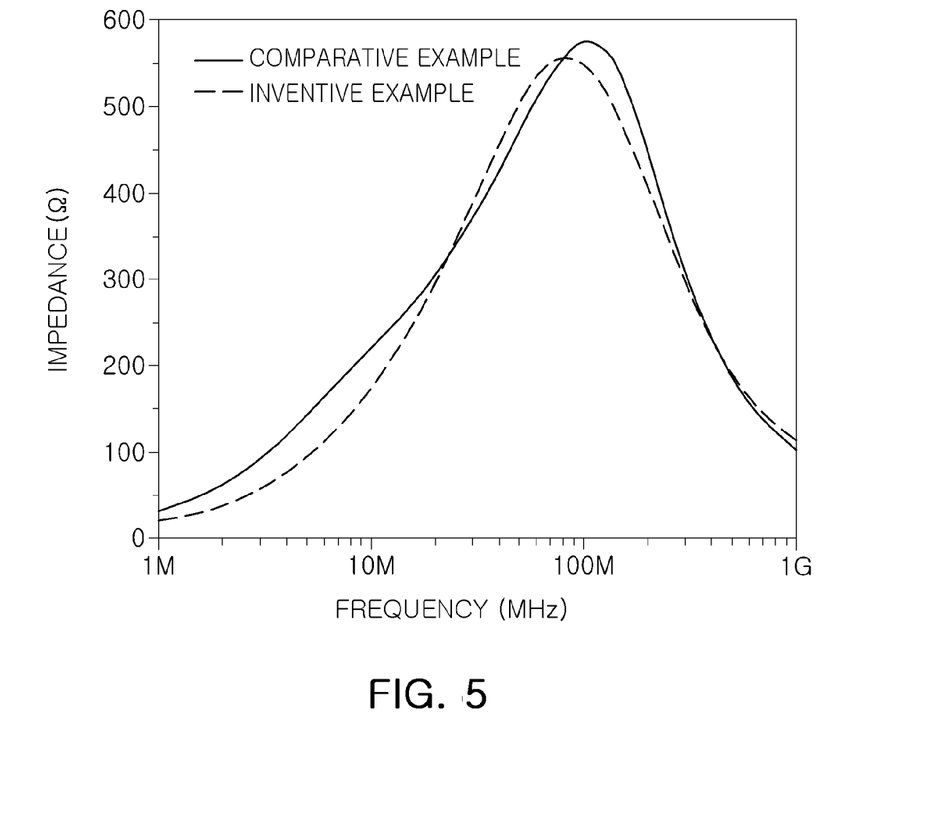

More specifically, as shown in FIG. 5, it may be appreciated that in the case of an inductor (Inventive Example) in which the ferrite according to an embodiment of the present disclosure was used in the magnetic layer, even when the ferrite was sintered simultaneously with the coil part containing copper under an atmosphere with a pressure lower than a Cu—$Cu_2O$ equilibrium oxygen partial pressure, the impedance properties were secured at a level similar to those in an inductor (Comparative Example) including a coil part formed of silver (Ag).

Further, a greater content of vanadium (V) may exist in grain boundaries of the ferrite than in grains of the ferrite. When a content of vanadium (V) existing in the grains of the ferrite is defined as a and a content of vanadium (V) existing in the grain boundaries of the ferrite is defined as b, a/b may be 0.8 or less (a/b≤0.8).

The ferrite may contain 1.82 to 10 parts by mole of vanadium (V) calculated as vanadium oxide based on 100 parts by mole of iron (Fe) calculated as iron oxide ($Fe_2O_3$)

The insulation resistance of the ferrite may be 10000 Ωcm or greater, and may be higher in the grain boundaries than in the grains.

The magnetic layer 111 according to the embodiment of the present disclosure may contain the above-described ferrite and be formed by sintering. The method of forming the magnetic layer is not particularly limited thereto, and the magnetic layer 111 may be formed by mixing a ceramic magnetic material powder containing the ferrite according to the embodiment of the present disclosure in a solvent together with a binder, and the like, uniformly dispersing the ceramic magnetic material powder in the solvent using a ball milling method, or the like, manufacturing a thin magnetic sheet using a doctor blade method, or the like, and then sintering the manufactured magnetic sheet.

Further, at least one cover layer 111c may be formed in the upper and lower portions of the multilayer body 110, respectively.

The cover layer 111c may have the same material and configuration as those of the magnetic layer 111 except that it does not include the conductive pattern of the coil part.

The cover layer 111c may basically serve to prevent the coil part 120 from being damaged by physical or chemical stress.

The external electrodes 130 may contact both ends of the coil part 120 exposed through the multilayer body 110 to thereby be electrically connected thereto, respectively.

The external electrodes 130 as described above may be formed on the multilayer body 110 by dipping the multilayer body 110 in a conductive paste, or using various methods such as a printing method, a deposition method, a sputtering method, or the like.

The conductive paste may be formed of a material containing at least one of silver (Ag), copper (Cu), and a copper (Cu) alloy, but the present disclosure is not limited thereto.

In addition, if necessary, a nickel (Ni) plating layer (not shown) and a tin (Sn) plating layer (not shown) may be further formed on outer surfaces of the external electrodes 130.

Experimental Examples

The following Table 1 shows data indicating experimental results obtained by evaluating specific resistance properties of a NiZnMn-based ferrite according to a content of vanadium oxide ($V_2O_5$).

Magnetic sheets were formed using ferrites with changing contents of vanadium oxide. A copper conductive pattern was formed on each magnetic sheet, and then five magnetic sheets including the copper conductive pattern formed thereon were stacked. Then, the stacked magnetic sheets were sintered under an atmosphere with an oxygen concentration of 25 ppm or less, such that the magnetic sheets and the conductive patterns were simultaneously sintered. Thereafter, specific resistance values of the magnetic layers formed by sintering the magnetic sheets were measured.

TABLE 1

| Sample | Content (mol %) | | | | | Sintering Temperature (° C.) | Specific Resistance (Ω cm) |
|---|---|---|---|---|---|---|---|
| | $Fe_2O_3$ | NiO | ZnO | MnO | $V_2O_5$ | | |
| 1* | 45.8 | 11 | 20 | 23 | 0.2 | 900 | 452 |
| 2* | 45.6 | 11 | 20 | 23 | 0.4 | 900 | 786 |

TABLE 1-continued

| Sample | Content (mol %) | | | | | Sintering Temperature (° C.) | Specific Resistance (Ω cm) |
| --- | --- | --- | --- | --- | --- | --- | --- |
| | $Fe_2O_3$ | NiO | ZnO | MnO | $V_2O_5$ | | |
| 3* | 45.2 | 11 | 20 | 23 | 0.6 | 900 | 1465 |
| 4* | 45.0 | 11 | 20 | 23 | 0.8 | 900 | 9546 |
| 5 | 45 | 11 | 20 | 23 | 1 | 900 | 212274 |
| 6 | 44 | 11 | 20 | 23 | 2 | 900 | 169982 |
| 7 | 43 | 11 | 20 | 23 | 3 | 900 | 128316 |
| 8 | 42 | 11 | 20 | 23 | 4 | 900 | 82713 |
| 9 | 45 | 11 | 20 | 23 | 1 | 880 | 998856 |
| 10 | 44 | 11 | 20 | 23 | 2 | 880 | 372427 |
| 11 | 43 | 11 | 20 | 23 | 3 | 880 | 340274 |
| 12 | 42 | 11 | 20 | 23 | 4 | 880 | 224984 |
| 13 | 46 | 15 | 20 | 19 | 2 | 900 | 316305 |
| 14 | 46 | 14 | 20 | 20 | 2 | 900 | 276358 |
| 15 | 46 | 13 | 20 | 21 | 2 | 900 | 232961 |
| 16 | 46 | 12 | 20 | 22 | 2 | 900 | 240884 |
| 17 | 46 | 10 | 20 | 19 | 2 | 900 | 175830 |
| 18 | 46 | 9 | 20 | 20 | 2 | 900 | 171907 |
| 19 | 46 | 8 | 20 | 21 | 2 | 900 | 173334 |
| 20 | 46 | 7 | 20 | 22 | 2 | 900 | 153336 |
| 21* | 41 | 11 | 20 | 23 | 5 | 900 | 65763 |
| 22* | 40 | 11 | 20 | 23 | 6 | 900 | 43215 |

*Comparative Example

As shown in Table 1, in the case in which the content of vanadium oxide ($V_2O_5$) was 1 mol % or greater, the specific resistance of the ferrite was significantly increased, and in the case in which the content of vanadium oxide ($V_2O_5$) was greater than 4 mol %, the specific resistance started to be decreased.

Therefore, it may be appreciated that vanadium oxide ($V_2O_5$) may be contained in a range of 1 to 4 mol %.

As set forth above, according to exemplary embodiments of the present disclosure, a ferrite capable of being sintered under a reducing atmosphere and improving insulation resistance, and an inductor including the same may be provided.

While exemplary embodiments have been shown and described above, it will be apparent to those skilled in the art that modifications and variations could be made without departing from the spirit and scope of the present disclosure as defined by the appended claims.

What is claimed is:

1. An inductor comprising:
a multilayer body in which a plurality of magnetic layers containing a ferrite are laminated;
a coil part including a plurality of conductive patterns disposed in the multilayer body, the coil part contains at least one of copper or a copper-nickel alloy; and
external electrodes electrically connected to the coil part,
wherein the ferrite contains 40 to 55 mol % of iron (Fe) calculated as $Fe_2O_3$, 5 to 20 mol % of nickel (Ni) calculated as NiO, 15 to 25 mol % of zinc (Zn) calculated as ZnO, 15 to 30 mol % of manganese (Mn) calculated as MnO, and 1 to 4 mol % of vanadium (V) calculated as $V_2O_5$.

2. The inductor of claim 1, wherein the ferrite is sintered simultaneously with the coil part.

3. The inductor of claim 1, wherein the ferrite is sintered under an atmosphere with a pressure lower than a Cu—$Cu_2O$ equilibrium oxygen partial pressure.

4. The inductor of claim 1, wherein when a content of vanadium (V) existing in grains of the ferrite is defined as a and a content of vanadium (V) existing in grain boundaries of the ferrite is defined as b, a/b is 0.8 or less (a/b≤0.8).

5. The inductor of claim 1, wherein the ferrite has higher insulation resistance in grain boundaries than in grains.

6. An inductor comprising:
a multilayer body in which a plurality of magnetic layers containing a ferrite are laminated;
a coil part including a plurality of conductive patterns disposed in the multilayer body, the coil part contains at least one of copper or a copper-nickel alloy; and
external electrodes electrically connected to the coil part,
wherein the ferrite contains 40 to 55 mol % of iron (Fe) calculated as $Fe_2O_3$, 5 to 20 mol % of nickel (Ni) calculated as NiO, 15 to 25 mol % of zinc (Zn) calculated as ZnO, 15 to 30 mol % of manganese (Mn) calculated as MnO, and 1 to 4 mol % of vanadium (V) calculated as $V_2O_5$, and
the ferrite contains 1.82 to 10 parts by mole of vanadium (V) calculated as vanadium oxide based on 100 parts by mole of iron (Fe) calculated as iron oxide.

7. The inductor of claim 6, wherein when a content of vanadium (V) existing in grains of the ferrite is defined as a and a content of vanadium (V) existing in grain boundaries of the ferrite is defined as b, a/b is 0.8 or less (a/b≤0.8).

8. An inductor comprising:
a multilayer body in which a plurality of magnetic layers containing a ferrite are laminated; and
a coil part disposed in the multilayer body and containing at least one of copper (Cu) or a copper-nickel alloy;
wherein the ferrite is sintered simultaneously with the coil part under a reducing atmosphere, and
wherein the ferrite contains 40 to 55 mol % of iron (Fe) calculated as $Fe_2O_3$, 5 to 20 mol % of nickel (Ni) calculated as NiO, 15 to 25 mol % of zinc (Zn) calculated as ZnO, 15 to 30 mol % of manganese (Mn) calculated as MnO, and 1 to 4 mol % of vanadium (V) calculated as $V_2O_5$.

9. The inductor of claim 8, wherein when a content of vanadium (V) existing in grains of the ferrite is defined as a and a content of vanadium (V) existing in grain boundaries of the ferrite is defined as b, a/b is 0.8 or less (a/b≤0.8).

10. An inductor including a ferrite comprising iron (Fe), manganese (Mn), nickel (Ni), zinc (Zn), and vanadium (V),
wherein the inductor further includes a multilayer body in which a plurality of magnetic layers containing the ferrite are laminated, and a coil part disposed in the multilayer body and containing at least one of copper (Cu) or a copper-nickel alloy,
wherein the ferrite contains 40 to 55 mol % of iron (Fe) calculated as $Fe_2O_3$, 5 to 20 mol % of nickel (Ni) calculated as NiO, 15 to 25 mol % of zinc (Zn) calculated as ZnO, 15 to 30 mol % of manganese (Mn) calculated as MnO, and 1 to 4 mol % of vanadium (V) calculated as $V_2O_5$, and
wherein when a content of vanadium (V) existing in grains of the ferrite is defined as a and a content of vanadium (V) existing in grain boundaries of the ferrite is defined as b, a/b is 0.8 or less (a/b≤0.8).

11. The ferrite of claim 10, wherein the ferrite is sintered under an atmosphere with a pressure lower than a Cu—$Cu_2O$ equilibrium oxygen partial pressure.

12. An inductor comprising:
a ferrite body having first and second opposing sides;
a conductive coil disposed in the ferrite body;
a first external electrode disposed on the first side of the ferrite body electrically connected to the conductive coil; and
a second external electrode disposed on the second side of the ferrite body electrically connected to the conductive coil, wherein the conductive coil comprises copper, copper-nickel alloy, or mixtures thereof, and wherein the ferrite contains 40 to 55 mol % of iron (Fe) calculated as $Fe_2O_3$, 5 to 20 mol % of nickel (Ni) calculated as NiO, 15 to 25 mol % of zinc (Zn) calculated as ZnO, 15 to 30 mol % of manganese (Mn) calculated as MnO, and 1 to 4 mol % of vanadium (V) calculated as $V_2O_5$.

13. The inductor of claim 12, wherein when a content of vanadium (V) existing in grains of the ferrite is defined as a and a content of vanadium (V) existing in grain boundaries of the ferrite is defined as b, a/b is 0.8 or less (a/b≤0.8).

14. The inductor of claim 12, wherein the ferrite has higher insulation resistance in grain boundaries than in grains.

* * * * *